United States Patent
Corriveau et al.

(10) Patent No.: US 6,643,899 B2
(45) Date of Patent: Nov. 11, 2003

(54) SPIRAL FOR INTERCONNECTING ENDS OF ENDLESS BELT SEGMENTS

(75) Inventors: André Corriveau, 6410, Fontaine, Rock-Forest, Québec (CA), J1N 2S6; Sylvain Crête, Sawyerville (CA); Caroline Fraser, Sherbrooke (CA); Jean-Sébastien Plante, Sherbrooke (CA)

(73) Assignee: André Corriveau, Rock Forest (CA)

( * ) Notice: Subject to any disclaimer, the term of this patent is extended or adjusted under 35 U.S.C. 154(b) by 0 days.

(21) Appl. No.: 10/042,325

(22) Filed: Jan. 11, 2002

(65) Prior Publication Data

US 2002/0056174 A1 May 16, 2002

Related U.S. Application Data

(63) Continuation-in-part of application No. 09/690,851, filed on Oct. 18, 2000.

(30) Foreign Application Priority Data

Jun. 16, 2000 (CA) ............................................. 2311845

(51) Int. Cl.[7] ........................ B65G 15/32; B65G 15/30; F16G 3/02
(52) U.S. Cl. ....................................................... 24/33 P
(58) Field of Search ............................ 24/31 R, 31 W, 24/33 A, 33 C, 33 P, 383, 391, 392, 396, 397; 474/253, 255, 256

(56) References Cited

U.S. PATENT DOCUMENTS

| | | | |
|---|---|---|---|
| 2,228,926 A | 1/1941 | Matthaei et al. | 24/33 |
| 2,858,592 A | 11/1958 | Schwartz | 24/205.16 |
| 3,057,031 A | 10/1962 | Wahl | 24/205.16 |
| 3,815,645 A | 6/1974 | Codorniu | 139/383 A |
| 3,906,595 A | 9/1975 | Moertel | 24/205.13 C |
| 3,975,802 A | 8/1976 | Moertel | 24/205.16 C |
| 4,167,055 A | 9/1979 | Molnar | 24/205.16 C |
| 4,314,589 A | 2/1982 | Buchanan et al. | 139/383 A |
| 4,395,308 A | 7/1983 | Dawes | 162/232 |
| 4,438,788 A | 3/1984 | Harwood | 139/383 A |
| 4,476,902 A | 10/1984 | Westhead | 139/383 A |
| 4,539,730 A | 9/1985 | Romanski | 24/33 B |
| 4,567,077 A | 1/1986 | Gauthier | 428/114 |
| 4,574,435 A | 3/1986 | Luciano et al. | 24/33 C |
| 4,654,122 A | 3/1987 | Bachmann et al. | 162/348 |
| 4,658,863 A | 4/1987 | Errecart | 139/383 A |
| 4,775,446 A | 10/1988 | Eschmann | 162/348 |
| 4,791,708 A | 12/1988 | Smolens | 24/33 C |
| 4,827,579 A | 5/1989 | Gisbourne | 24/391 |
| 4,862,926 A | 9/1989 | Barrette et al. | 139/383 A |
| 4,970,288 A | 11/1990 | Larkin et al. | 528/272 |
| 5,142,747 A | 9/1992 | Matsushima | 24/391 |
| 5,167,051 A | 12/1992 | Kousaka | 24/391 |
| 5,669,114 A * | 9/1997 | Jakob | 24/33 P |
| 5,915,422 A | 6/1999 | Fagerholm | 139/383 AA |
| 6,134,756 A | 10/2000 | Matsuda | 24/391 |
| 6,328,079 B1 * | 12/2001 | Zils | 139/383 AA |

FOREIGN PATENT DOCUMENTS

| | | |
|---|---|---|
| CA | 1320066 | 7/1993 |
| CA | 1329502 | 5/1994 |
| DE | 2059021 | 3/1972 |
| EP | 0275656 | 7/1988 |
| EP | 0674041 | 9/1995 |
| EP | 0967306 | 12/1999 |
| GB | 1266891 | 3/1972 |

* cited by examiner

Primary Examiner—J. J. Swann
Assistant Examiner—Ruth C. Rodriguez
(74) Attorney, Agent, or Firm—Robic

(57) ABSTRACT

A spiral for interconnecting ends of endless belt segments with terminal fabric loops using a pintle. The spiral comprises a series of loops having inverted U-shaped loop portions extending in a transverse direction of the spiral. The loop portions have legs spaced apart from each other for passage of the pintle therebetween, and uppermost heads bending from and extending between the legs. U-shaped loop linking portions extend diagonally with respect to a longitudinal direction of the spiral, between lower ends of the legs of successive loops. The loop portions are parallel with and spaced from one another by a definite pitch distance matching with the fabric loops and adapted to define openings for interdigitation with a like spiral to form a channel for the pintle without longitudinal deformation of the spirals during the interdigitation.

16 Claims, 4 Drawing Sheets

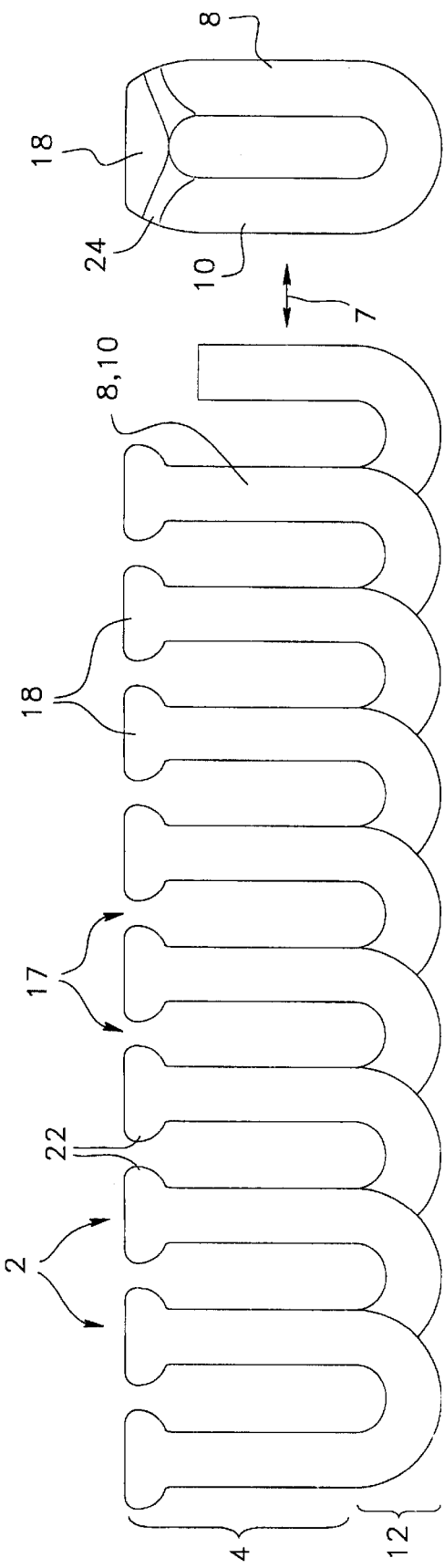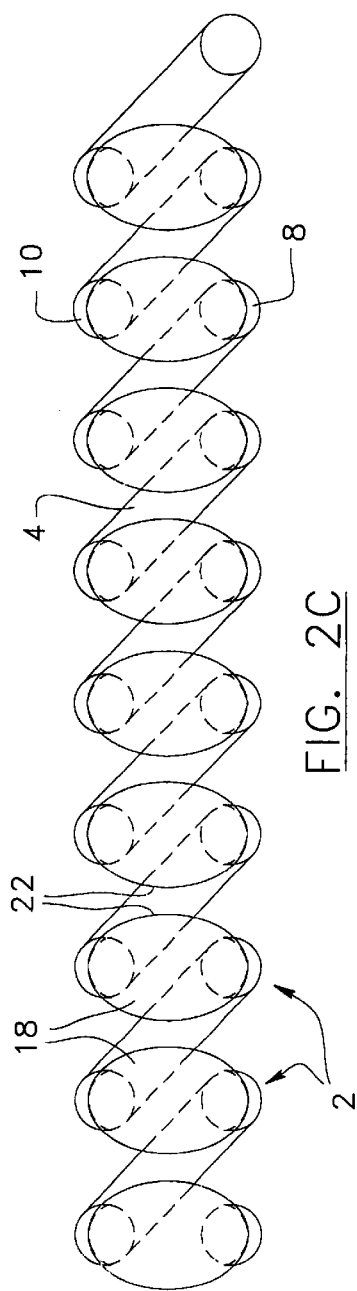

SPIRAL FOR INTERCONNECTING ENDS OF ENDLESS BELT SEGMENTS

CROSS REFERENCE TO RELATED APPLICATION

This application is a continuation-in-part of Ser. No. 09/690,851 of Oct. 18, 2000, still pending.

FIELD OF THE INVENTION

The present invention relates to a spiral for interconnecting ends of endless belt segments.

BACKGROUND

Segments of an endless belt have ends provided with sets of terminal fabric loops interdigitatable with one another so that the segments can be connected together by insertion of a pintle into the channel formed by the interdigitated sets of loops of two adjacent belt segments. The sets of loops and the pintle are however subjected to high stresses and strains during operation of the endless belt, so their design and strength are of utmost importance as a loose segment or pintle may cause important damages to the machine or serious injuries to a passer-by.

The sets of loops are frequently provided by spirals seamed at the ends of the belt segments. U.S. Pat. No. 5,915,422 (Fagerholm) shows an example of such a spiral attached at the end of a woven (felt) belt. When viewed sideways, the spiral exhibits a series of V-shaped loops spaced from one another by straight sections especially intended to receive flat filament yarns for attachment of the spiral to the end of the belt section. The interdigitation of two such spirals at the ends of adjacent belt sections is however uneven and unsteady due to the mismatching of the loops between the two interdigitated sets and the large spaces left between the loops for the yarns. Furthermore, the interdigitation is frequently incomplete or partial as a result of the non-complementary shapes of the spirals, so the resulting channel has a reduced size compared to the size of the loops and thus only a small size pintle can disadvantageously be used instead of a larger size one. Furthermore, the pintle is prone to jam in or to deviate out of the channel due to its unevenness and irregularity.

U.S. Pat. Nos. 4,539,730 (Romanski), 4,791,708 (Smolens), EP patent applications Nos. 0,275,656 (Gisourne) published on Jul. 27, 1988, 0,674,041 (Lorenz et al.) published on Sep. 27, 1995, and DE patent application No. 2,059,021 (Andrejewski et al.) published on Jun. 8, 1972 provide examples of spirals of the prior art. Each one of these spirals has its particular features for specific purposes, e.g. straight securing portions for improving the seam, interference fit to facilitate the joining of the spirals, etc. Yet, none of them can be made according to a monofilament diameter, a width, a height and especially a pitch, to fully meet the very requirements of the manufacturer's endless belts for which they are intended. As a result, they must be stretched or contracted during their assembly with the endless belts. Such longitudinal deformation makes the channel uneven and irregular with the aforesaid problems. It also increases the installation time and effort.

Also, spirals having a pitch of about two times the diameter of the monofilament are very difficult to make due to the shifting of the monofilament during the production of the spiral. No such spirals have apparently ever been successfully produced based on the teachings of the above patents. It is also worth mentioning that known manufactured spirals for interconnecting endless belt segments come in asymmetrical pair, i.e. left and right ones which cannot be interchanged and are also a cause of the aforesaid problems. The currently known spiral designs are limited to a few models which in many cases are fairly unfit for the ever changing models of endless belt segments.

SUMMARY

An object of the invention is to provide a spiral for interconnecting ends of endless belt segments using a pintle, which better interdigitates with like spirals than the spirals of the prior art and which allows the use of a larger size pintle for interlocking the spirals together.

Another object of the invention is to provide such a spiral having loops that fully insert down to the bottom of a like spiral, and provide a fairly smooth and regular inner channel facilitating the insertion of the pintle.

Another object of the invention is to provide such a spiral which can be easily manufactured in a large range of sizes and models to fit multiple needs and applications.

Another object of the invention is to provide such a spiral which can be made according to a required pitch for easier assembly with the endless belt, with the pitch possibly ranging over twice the diameter of the monofilament used to form the spiral.

According to the present invention, there is provided a spiral for interconnecting ends of endless belt segments with terminal fabric loops using a pintle. The spiral comprises a series of loops having preformed inverted U-shaped loop portions extending in a transverse direction of the spiral. The loop portions have front and rear parallel legs spaced apart from each other for passage of the pintle therebetween, and an uppermost head bending from and extending between the legs. Preformed U-shaped loop linking portions extend diagonally with respect to a longitudinal direction of the spiral, between lower ends of the front legs and lower ends of the rear legs of the next loop portions respectively. The loop portions are parallel with and spaced from one another by a definite pitch distance in the longitudinal direction of the spiral, adapted to match with the fabric loops at the ends of the endless belt segments and to define openings for interdigitation with a like spiral to form a channel for the pintle without longitudinal deformation of the spirals during interdigitation.

Each loop portion may have projections made out of the spiral on opposite sides of the loop portion in the longitudinal direction of the spiral, for interlocking with like projections on the like spiral.

Preferably, the heads and the loop linking portions have substantially straight portions, so that the channel has a cross-section more rectangular than oblong.

The spiral according to the invention almost fully blends with a like spiral, which leaves more inner space for a larger pintle or for receiving a filling material, while facilitating the spiral assembly.

According to the present invention, there is also provided a process for producing the spiral, wherein a monofilament made of a thermoformable material is wound around a rod having a cross-section reflecting a desired inner shape of the spiral. The wound monofilament is press-shaped against the rod so that it forms a series of loops having the aforesaid features. The press-shaped monofilament is subjected to a heating and cooling fixating cycle.

BRIEF DESCRIPTION OF THE DRAWINGS

A detailed description of preferred embodiments will be given herein below with reference to the following drawings, in which like numbers refer to like elements:

FIGS. 2A–C are front and side elevation and top views of a spiral with interlocking heads according to the invention;

DETAILED DESCRIPTION OF THE PREFERRED EMBODIMENTS

Figure 1B:
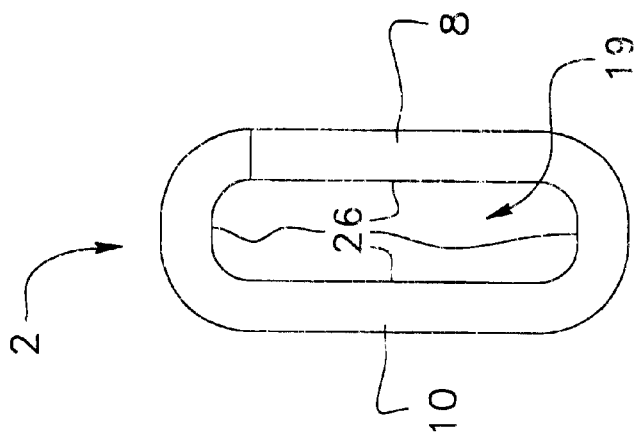
FIGS. 1A–B are front and side elevation views of a spiral according to the invention.
Figure 1A:
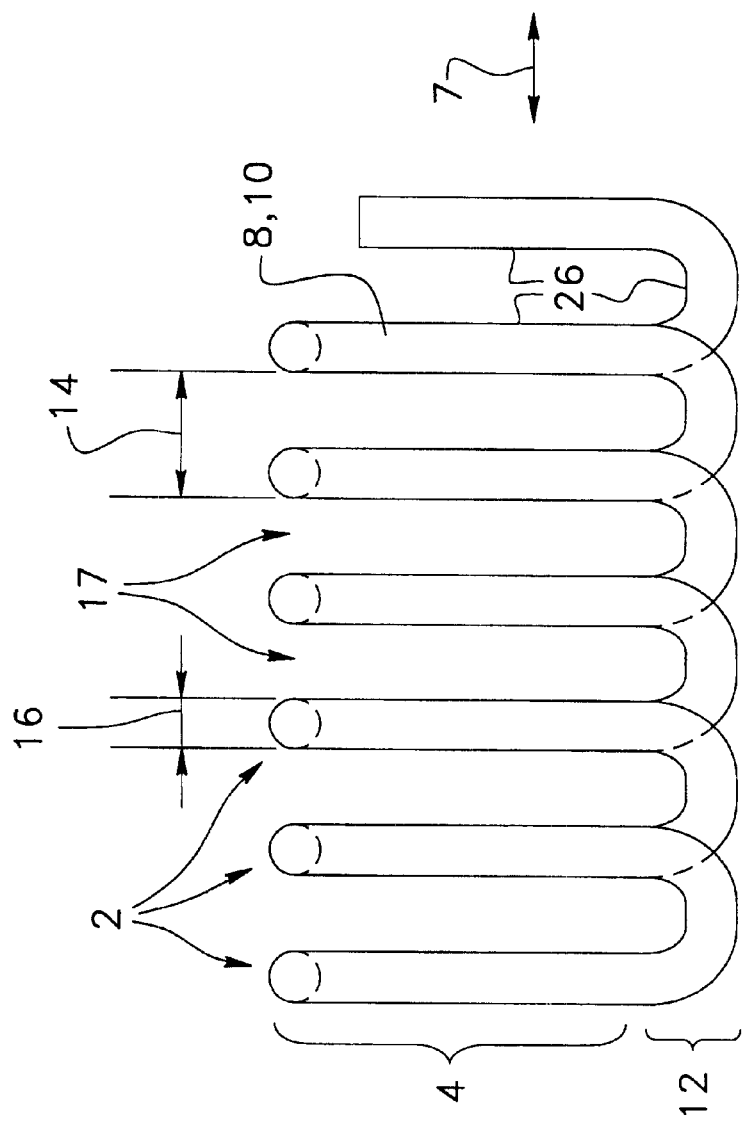
Figure 3:
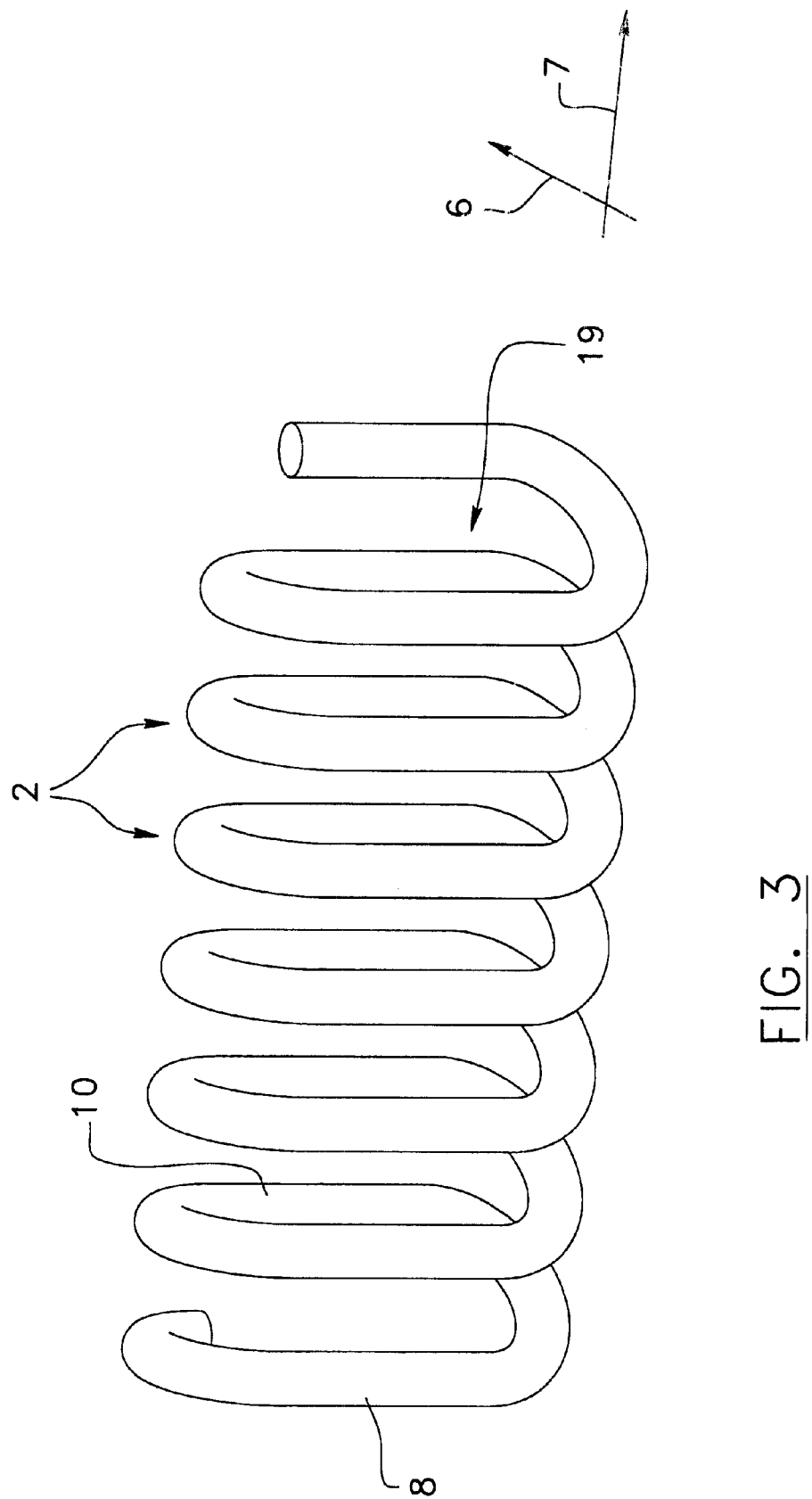
FIG. 3 is a perspective view illustrating a spiral according to the invention.

Referring to FIGS. 1A–B and 3, there is shown a spiral according to the invention, for interconnecting ends of endless belt segments with terminal fabric loops using a pintle (not shown in the Figures). The spiral comprises a series of loops 2 each having a preformed inverted U-shaped loop portion 4 extending in a transverse direction of the spiral, as depicted by arrow 6 in FIG. 3.

The loop portion 4 has front and rear parallel legs 8, 10 spaced apart from each other for passage of the pintle therebetween, as best shown in FIG. 3. The loop portion 4 has also an uppermost head 18 bending from and extending between the legs 8, 10.

Figure 4:
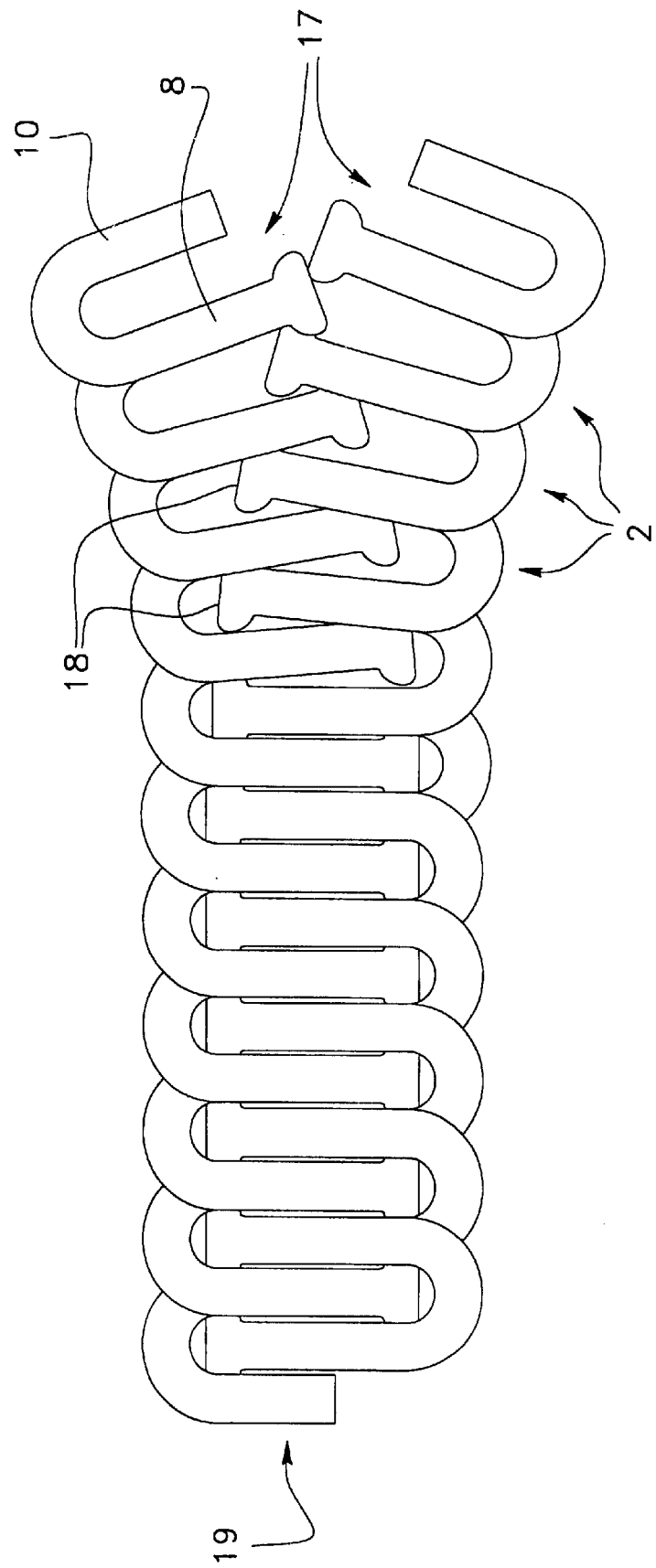
FIG. 4 is a side elevation view illustrating two spirals with interlocking heads during interdigitation in order to interconnect ends of endless belt segments.

Each loop 2 also has a preformed U-shaped loop linking portion 12 extending diagonally with respect to a longitudinal direction 7 of the spiral, between a lower end of the front leg 8 of the loop portion 4 and a lower end of a rear leg 10 of a loop portion 4 of a next one of the loops 2. The loop portions 4 are parallel with and spaced from one another by a definite pitch distance 14 in the longitudinal direction 7 of the spiral, adapted to match with the fabric loops at the ends of the endless belt segments and to define openings 17 for interdigitation with a like spiral to form a channel 19 for the pintle, as best shown in FIG. 4, without longitudinal deformation (stretching or contracting) of the spirals during the interdigitation. As there is no deformation, the interdigitation and assembly with the endless belt segments are quite simple and easy, and the original dimensional and formal features of the spirals are preserved without any spatial or structural losses. Also, the inner channel 19 is thus fairly if not fully smooth and even, which facilitates the insertion of the pintle. Due to its symmetry, there is no longer any need for a left and right spiral model.

The series of loops 2 can be made of a monofilament (single wire) of polyester (trademark), nylon (trademark), PEEK (PolyEther Ether Ketone), PVDS (Fluoropolymer), Ryton (trademark), or any other suitable material. A thread can also be used instead of a monofilament if desired. For interconnection of belt segments in paper industries, a polyester that resists to hydrolysis should preferably be used. For interconnection of belt segments in food industries, an atoxic material should be used. The monofilament may have a flat cross-section, providing more inner space for the channel 19. The spirals according to the invention can be seamed or otherwise attached to the ends of the belt segments to be interconnected with yarns woven in the belt segments and curling back around the linking portions 12, forming the aforesaid terminal fabric loops. Without further alteration, the loop and linking portions 4, 12 have a uniform cross-section as illustrated in FIGS. 1A–B and 3.

Referring to FIGS. 2A–C, each loop portion 4 may have projections 22 made out of the spiral on opposite sides of the loop portion 4 in the longitudinal direction 7 of the spiral, for interlocking with like projections 22 on the like spiral as exemplified in FIG. 4. The projections 22 can be made by a flattening of the head 18 between the legs 8, 10 of each loop portion 4, provided that the monofilament has a cross-section (e.g. a round cross-section) suitable for the flattening operation which involves no injection of additional material. As shown in FIG. 2B, the heads 18 have a flared profile with bent surfaces 24 between the heads and the legs 8, 10 as a result of the flattening operation. As shown in FIG. 2C, the heads 18 preferably have an oval shape when viewed from above. Such an interlocking feature is particularly useful to hold back the spirals together the time to install the pintle inside the channel 19. This feature along with the design of the spirals also prevent cross disengagement of the loops of the spirals if they are subjected to a contracting force. However, a loss in the strength of the resulting interconnection is likely to happen due to the flattening of the wire to form the heads 18 when made in this way.

Referring to FIGS. 1A–B and 3, the legs 8, 10 of each loop portion 4 may be longer than a width 16 of the loop portion 4 in the transverse direction 6 of the spiral, so that the channel 19 has an obround cross-section adapted to receive a flat pintle. Furthermore, the heads 18 and the loop linking portions 12 preferably have substantially flat inner faces 26 so that the channel 19 has a cross-section more rectangular than oblong. Such a feature may especially be difficult to achieve for smaller sizes of spirals due to the bending of the material, yet more channel space is nevertheless obtained compared to conventional spirals.

Referring to FIG. 4, typical sizes (or models) of spirals made according to the invention are 5.2 mm (height)×2.6 mm (transverse width of a loop 2), 3.7 mm×2.2 mm, and 0.38 mm×0.63 mm. Larger or smaller sizes can also be considered, provided that the loop per spiral rate is adjusted accordingly. The gauge of the wire used to make the spiral can be chosen according to the needs (desired strength, available space for the spiral, etc.). The design of the spirals according to the invention allows two interdigitated spirals to reach the bottom of the other. With the larger channel 19 obtained with the spirals according to the invention, a larger (stronger) pintle can be used, or a remaining gap in the channel 19 after pintle insertion can be filled with a suitable material.

Typical pitch distances 14 with the spiral according to the present invention range from one time to at least twice a diameter of the material used to form the spiral. Thus, the very requirements specified by the client can be met. In fact, contrary to the limited number of physical characteristics that a client is used to specify when ordering conventional types of spirals, the following parameters can be specified for the manufacture of the spirals according to the present invention: the type of spiral (regular or with teeth); the material; the diameter of the monofilament; the dimensions of the monofilament; the spiral dimensions (width× thickness); the number of pitch of the spiral /100 mm (or another predetermined spiral length). Thus, the spirals according to the present invention fully match with the endless belt segments and their terminal loops, instead of deforming the spirals to match the terminal loops of the endless belt segments or stretching the terminal loops to match the spirals as in the conventional practice, with all the problems related to such practice. The pitch of the spirals according to the present invention can be chosen so that more than one yet a definite number of terminal loops hook around each loop linking portion 12 of the spirals.

The spiral can advantageously be produced using a monofilament made of thermoformable material. The monofilament is first wound around a rod (not shown in the Figures) having a cross-section reflecting a desired inner shape of the spiral (i.e. to form the channel 19). The wound monofilament is press-shaped against the rod so that it forms a series of loops 2 having the above described features. The press-shaped monofilament is then subjected to a heating and cooling fixating cycle.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A spiral for interconnecting ends of endless belt segments with terminal fabric loops using a pintle, comprising a series of loops each having:
    a preformed inverted U-shaped loop portion extending in a transverse direction of the spiral, the loop portion having front and rear parallel legs spaced apart from each other for passage of the pintle therebetween, and an uppermost head bending from and extending between the legs, the front and rear legs having lower ends; and
    a preformed U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the heads and the loop linking portions having substantially straight portions, so that the channel has a cross-section more rectangular than oblong.

2. The spiral according to claim 1, wherein the head of each loop portion has projections made out of the spiral on opposite sides of the loop portion in the longitudinal direction of the spiral, for interlocking with like projections on the like spiral.

3. The spiral according to claim 2, wherein the series of loops are made of a monofilament having a round cross-section.

4. The spiral according to claim 3, wherein the projections of the heads are made by flattening of the monofilament between the legs of each loop portion.

5. The spiral according to claim 4, wherein the heads have an oval shape when viewed from above.

6. The spiral according to claim 4, wherein the heads have a flared profile with bent surfaces between the heads and the legs.

7. The spiral according to claim 1, wherein the series of loops are made of a monofilament having a round cross-section.

8. The spiral according to claim 1, wherein the series of loops are made of a monofilament of polyester, nylon, polyether ether ketone, or a fluoropolymer.

9. The spiral according to claim 1, wherein the series of loops are made of a monofilament of an atoxic polyester.

10. The spiral according to claim 1, wherein the series of loops are made of a monofilament of hydrolysis-resistant polyester.

11. The spiral according to claim 1, wherein the pitch distance ranges from one time to at least twice a diameter of a monofilament forming the spiral.

12. A spiral for interconnecting ends of endless belt segments with terminal fabric loops using a pintle, comprising a monofilament made of a thermoformable material, the monofilament being wound around a rod having a cross-section reflecting a desired inner shape of the spiral, the wound monofilament being press-shaped against the rod so that the monofilament forms a series of loops each having:
    an inverted U-shaped loop potion extending in a transverse direction of the spiral, the loop portion having front and rear parallel legs spaced apart from each other for passage of the pintle therebetween, and an uppermost head bending from and extending between the legs, the front and rear legs having lower ends, and
    a U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the heads and the loop linking portions have substantially straight portions, so that the channel has a cross-section more rectangular than oblong;
    the press-shaped monofilament being subjected to a heating and cooling fixating cycle.

13. A spiral for interconnecting ends of endless belt segments with terminal fabric loops using a pintle, comprising a series of loops each having:
    a preformed inverted U-shaped loop portion extending in a transverse direction of the spiral, the loop portion having front and rear parallel legs spaced apart from each other for passage of the pintle therebetween, and an uppermost head bending from and extending between the legs, the front and rear legs having lower ends; and
    a preformed U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the series of loops being made of a monofilament having a flat cross-section, the head of each loop portion having projections made out of the spiral on opposite sides of the loop portion in the longitudinal direction of the spiral, for interlocking with like projections on the like spiral.

14. A spiral for interconnecting ends of endless belt segments with terminal fabric loops using a pintle, comprising a series of loops each having:

a preformed inverted U-shaped loop portion extending in a transverse direction of the spiral, the loop portion having front and rear parallel legs spaced apart from each other for passage of the pintle therebetween, and an uppermost head bending from and extending between the legs, the front and rear legs having lower ends; and a preformed U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the series of loops being made of a monofilament having a flat cross-section, the series of loops being made of a monofilament of polyester, nylon, polyether ether ketone, or a fluoropolymer.

15. A spiral for interconnecting ends of endless belt segments with terminal fabric loops using a pintle, comprising a series of loops each having:

a preformed inverted U-shaped loop portion extending in a transverse direction of the spiral, the loop portion having front and rear parallel legs spaced apart from each other for passage of the pintle therebetween, and an uppermost head bending from and extending between the legs, the front and rear legs having lower ends; and a preformed U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the series of loops being made of a monofilament having a flat cross-section, the series of loops being made of a monofilament of an atoxic polyester.

16. A spiral for interconnecting ends of endless belt segments with terminal fabric loops using a pintle, comprising a series of loops each having:

a preformed inverted U-shaped loop portion extending in a transverse direction of the spiral, the loop portion having front and rear parallel legs spaced apart from each other for passage of the pintle therebetween, and an uppermost head bending from and extending between the legs, the front and rear legs having lower ends; and a preformed U-shaped loop linking portion extending diagonally with respect to a longitudinal direction of the spiral, between the lower end of the front leg of the loop portion and a lower end of a rear leg of a loop portion of a next one of the loops, the loop portions being parallel with and spaced from one another by a definite pitch distance in the longitudinal direction of the spiral adapted to match with the fabric loops at the ends of the endless belt segments and to define openings for interdigitation with a like spiral to form a channel for the pintle without longitudinal deformation of the spirals during the interdigitation, at least the loop linking portion and the legs of the loop portion having a uniform cross-section, and the series of loops being made of a monofilament having a flat cross-section, the series of loops being made of a monofilament of hydrolysis-resistant polyester.

* * * * *